United States Patent
Bloch

(10) Patent No.: US 9,190,110 B2
(45) Date of Patent: Nov. 17, 2015

(54) SYSTEM AND METHOD FOR ASSEMBLING A RECORDED COMPOSITION

(75) Inventor: Jonathan Bloch, Tel Aviv (IL)

(73) Assignee: JBF Interlude 2009 LTD (IL)

( * ) Notice: Subject to any disclaimer, the term of this patent is extended or adjusted under 35 U.S.C. 154(b) by 182 days.

(21) Appl. No.: 12/706,721

(22) Filed: Feb. 17, 2010

(65) Prior Publication Data

US 2010/0293455 A1 Nov. 18, 2010

(30) Foreign Application Priority Data

May 12, 2009 (IL) .......................................... 198717

(51) Int. Cl.
*G06F 3/048* (2013.01)
*G11B 27/34* (2006.01)
*G11B 27/036* (2006.01)
*G11B 27/034* (2006.01)
*G10H 1/00* (2006.01)
*G10H 1/36* (2006.01)
*G10H 7/00* (2006.01)

(52) U.S. Cl.
CPC .............. *G11B 27/034* (2013.01); *G06F 3/048* (2013.01); *G10H 1/0025* (2013.01); *G10H 1/368* (2013.01); *G10H 7/008* (2013.01); *G11B 27/036* (2013.01); *G11B 27/34* (2013.01); *G10H 2210/125* (2013.01)

(58) Field of Classification Search
CPC ..... G06F 3/0481; G06F 17/307; G06F 3/167; G06F 17/30053; G06F 3/048; G06F 17/30772
USPC ...................... 715/716, 255; 704/278; 84/625; 707/999.107
See application file for complete search history.

(56) References Cited

U.S. PATENT DOCUMENTS

| | | | |
|---|---|---|---|
| 5,568,602 A | 10/1996 | Callahan et al. | |
| 5,607,356 A | 3/1997 | Schwartz | |
| 5,636,036 A | 6/1997 | Ashbey | |
| 5,734,862 A | 3/1998 | Kulas | |
| 6,122,668 A | 9/2000 | Teng et al. | |
| 6,128,712 A | 10/2000 | Hunt et al. | |
| 6,191,780 B1 * | 2/2001 | Martin et al. | 715/201 |
| 6,222,925 B1 | 4/2001 | Shiels et al. | |
| 6,298,482 B1 | 10/2001 | Seidman et al. | |
| 7,379,653 B2 | 5/2008 | Yap et al. | |
| 7,627,605 B1 * | 12/2009 | Lamere et al. | 1/1 |

(Continued)

FOREIGN PATENT DOCUMENTS

| | | |
|---|---|---|
| DE | 10053720 A1 | 4/2002 |
| EP | 1033157 A2 | 9/2000 |

(Continued)

OTHER PUBLICATIONS

Archos Gen 5 English User Manual Version 3.0, July 26, 2007, p. 1-81.*

(Continued)

*Primary Examiner* — Stephen Hong
*Assistant Examiner* — Ahamed I Nazar
(74) *Attorney, Agent, or Firm* — Goodwin Procter LLP

(57) ABSTRACT

A system and method for assembling segments of recorded music or video from among various versions or variations of a recording, into a new version or composition, such that a first segment of a first version of a recorded work is attached to a segment of a second segment of a second version of the recorded work, to create a new version of the recorded work.

19 Claims, 5 Drawing Sheets

(56) References Cited

U.S. PATENT DOCUMENTS

| | | | |
|---|---|---|---|
| 7,917,505 | B2 | 3/2011 | van Gent et al. |
| 8,065,710 | B2 | 11/2011 | Malik |
| 8,650,489 | B1 | 2/2014 | Baum et al. |
| 9,021,537 | B2 | 4/2015 | Funge et al. |
| 2002/0091455 | A1 | 7/2002 | Williams |
| 2002/0120456 | A1 | 8/2002 | Berg et al. |
| 2002/0177914 | A1* | 11/2002 | Chase ............................ 700/94 |
| 2003/0159566 | A1* | 8/2003 | Sater et al. ..................... 84/615 |
| 2003/0183064 | A1* | 10/2003 | Eugene et al. ................. 84/609 |
| 2003/0184598 | A1 | 10/2003 | Graham |
| 2003/0221541 | A1* | 12/2003 | Platt .............................. 84/609 |
| 2005/0055377 | A1 | 3/2005 | Dorey et al. |
| 2005/0091597 | A1* | 4/2005 | Ackley ......................... 715/716 |
| 2005/0102707 | A1* | 5/2005 | Schnitman .................... 725/135 |
| 2006/0028951 | A1 | 2/2006 | Tozun et al. |
| 2006/0064733 | A1 | 3/2006 | Norton et al. |
| 2006/0150072 | A1* | 7/2006 | Salvucci .................... 715/500.1 |
| 2006/0155400 | A1* | 7/2006 | Loomis .......................... 700/94 |
| 2006/0200842 | A1 | 9/2006 | Chapman et al. |
| 2006/0224260 | A1* | 10/2006 | Hicken et al. .................. 700/94 |
| 2007/0118801 | A1* | 5/2007 | Harshbarger et al. ......... 715/730 |
| 2007/0157261 | A1* | 7/2007 | Steelberg et al. ............... 725/87 |
| 2007/0162395 | A1 | 7/2007 | Ben-Yaacov et al. |
| 2007/0239754 | A1* | 10/2007 | Schnitman .................... 707/101 |
| 2008/0021874 | A1 | 1/2008 | Dahl et al. |
| 2008/0022320 | A1 | 1/2008 | Ver Steeg |
| 2008/0031595 | A1 | 2/2008 | Cho |
| 2008/0086754 | A1 | 4/2008 | Chen et al. |
| 2008/0091721 | A1* | 4/2008 | Harboe et al. .............. 707/104.1 |
| 2008/0092159 | A1 | 4/2008 | Dmitriev et al. |
| 2008/0148152 | A1 | 6/2008 | Blinnikka et al. |
| 2008/0276157 | A1 | 11/2008 | Kustka et al. |
| 2008/0300967 | A1 | 12/2008 | Buckley et al. |
| 2008/0301750 | A1 | 12/2008 | Silfvast et al. |
| 2008/0314232 | A1* | 12/2008 | Hansson et al. ................ 84/625 |
| 2009/0022015 | A1* | 1/2009 | Harrison ........................... 369/1 |
| 2009/0024923 | A1 | 1/2009 | Hartwig et al. |
| 2009/0055880 | A1 | 2/2009 | Batteram et al. |
| 2009/0063681 | A1 | 3/2009 | Ramakrishnan et al. |
| 2009/0116817 | A1 | 5/2009 | Kim et al. |
| 2009/0199697 | A1* | 8/2009 | Lehtiniemi et al. ............. 84/600 |
| 2009/0228572 | A1 | 9/2009 | Wall et al. |
| 2009/0320075 | A1* | 12/2009 | Marko ............................ 725/56 |
| 2010/0077290 | A1 | 3/2010 | Pueyo |
| 2010/0153512 | A1 | 6/2010 | Balassanian et al. |
| 2010/0161792 | A1* | 6/2010 | Palm et al. .................... 709/224 |
| 2010/0167816 | A1 | 7/2010 | Perlman et al. |
| 2010/0186579 | A1* | 7/2010 | Schnitman .................... 84/625 |
| 2010/0262336 | A1 | 10/2010 | Rivas et al. |
| 2010/0268361 | A1* | 10/2010 | Mantel et al. .................... 700/94 |
| 2010/0278509 | A1 | 11/2010 | Nagano et al. |
| 2010/0287033 | A1 | 11/2010 | Mathur |
| 2010/0287475 | A1 | 11/2010 | van Zwol et al. |
| 2010/0293455 | A1 | 11/2010 | Bloch |
| 2010/0332404 | A1 | 12/2010 | Valin |
| 2011/0007797 | A1 | 1/2011 | Palmer et al. |
| 2011/0010742 | A1 | 1/2011 | White |
| 2011/0026898 | A1 | 2/2011 | Lussier et al. |
| 2011/0126106 | A1 | 5/2011 | Ben Shaul et al. |
| 2011/0131493 | A1 | 6/2011 | Dahl |
| 2011/0138331 | A1 | 6/2011 | Pugsley et al. |
| 2011/0191684 | A1 | 8/2011 | Greenberg |
| 2011/0197131 | A1 | 8/2011 | Duffin et al. |
| 2011/0200116 | A1 | 8/2011 | Bloch et al. |
| 2011/0246885 | A1 | 10/2011 | Pantos et al. |
| 2011/0252320 | A1 | 10/2011 | Arrasvuori et al. |
| 2011/0264755 | A1* | 10/2011 | Salvatore De Villiers .... 709/206 |
| 2012/0005287 | A1 | 1/2012 | Gadel et al. |
| 2012/0094768 | A1 | 4/2012 | McCaddon et al. |
| 2012/0110620 | A1 | 5/2012 | Kilar et al. |
| 2012/0198412 | A1 | 8/2012 | Creighton et al. |
| 2012/0308206 | A1 | 12/2012 | Kulas |
| 2013/0046847 | A1 | 2/2013 | Zavesky et al. |
| 2013/0054728 | A1 | 2/2013 | Amir et al. |
| 2013/0055321 | A1 | 2/2013 | Cline et al. |
| 2014/0040280 | A1* | 2/2014 | Slaney et al. ................. 707/748 |
| 2014/0129618 | A1 | 5/2014 | Panje et al. |

FOREIGN PATENT DOCUMENTS

| | | |
|---|---|---|
| EP | 2104105 | 9/2009 |
| GB | 2359916 A | 9/2001 |
| GB | 2428329 A | 1/2007 |
| JP | 2008005288 A | 1/2008 |
| WO | WO-00/59224 | 10/2000 |
| WO | WO-2007/062223 | 5/2007 |
| WO | WO-2007/138546 | 12/2007 |
| WO | WO-2008/001350 | 1/2008 |
| WO | WO-2008/057444 | 5/2008 |
| WO | WO-2008052009 A2 | 5/2008 |
| WO | WO-2009/137919 | 11/2009 |

OTHER PUBLICATIONS iTunes 11: How to Queue Next Song, Published Oct. 6, 2008, pp. 1-8.*
International Search Report, for International application PCT/IL2010/000362, Date of Mailing: Aug. 25, 2010.
Supplemental Search Report for PCT/IL2010/000362 mailed Jun. 28, 2012.
An ffmpeg and SDL Tutorial, "Tutorial 05: Synching Video," Retrieved from internet on Mar. 15, 2013: <http://dranqer.com/ffmpeg/tutorial05.html>, (4 pages).
Yang, H, et al., "Time Stamp Synchronization in Video Systems," Teletronics Technology Corporation, <http://www.ttcdas.com/products/daus encoders/pdf/ tech papers/tp 2010 time stamp video system.pdf>, Abstract, (8 pages).
Barlett, Mitch, (Oct. 6, 2008) "iTunes 11: How to Queue Next Song," *Technipages*, pp. 1-8, retrieved on Dec. 26, 2013 from the internet http://www.technipages.com/itunes-queue-next-song.html.
International Search Report and Written Opinion for International Patent Application PCT/IB2013/001000 mailed Jul. 31, 2013 (11 pages).
Miller, Gregor et al., (Sep. 3, 2009) "MiniDiver: A Novel Mobile Media Playback Interface for Rich Video Content on an iPhoneTM", *Entertainment Computing A ICEC 2009*, pp. 98-109.
Sodagar, I., (2011) "The MPEG-DASH Standard for Multimedia Streaming Over the Internet", *IEEE Multimedia*, IEEE Service Center, New York, NY US, vol. 18, No. 4, pp. 62-67.
Supplemental European Search Report for EP13184145 dated Jan. 30, 2014 (5 pages).
International Search Report for International Patent Application PCT/IL2012/000080 dated Aug. 9, 2012 (4 pages).
International Search Report for International Patent Application PCT/IL2012/000081 dated Jun. 28, 2012 (4 pages).
Labs.byHook: "Ogg Vorbis Encoder for Flash: Alchemy Series Part 1," [Online] Internet Article, Retrieved on Dec. 17, 2012 from the Internet: URL:http://labs.byhook.com/2011/02/15/ogg-vorbis-encoder-for-flash-alchemy-series-part-1/, 2011, (6 pages).

* cited by examiner

SYSTEM AND METHOD FOR ASSEMBLING A RECORDED COMPOSITION

CROSS-REFERENCE TO RELATED APPLICATIONS

This application claims priority from Israeli Patent Application No. 198717 filed May 12, 2009, which is hereby incorporated by reference.

FIELD OF THE INVENTION

The present invention generally relates to assembling a version of an audio or video recording, and may for example allow compilation of a version of a composition from segments of various recorded versions or variations of one or more compositions.

BACKGROUND OF THE INVENTION

Artists such as singers, film producers or videographers may record and make available more than one version of a particular composition, or multiple variations of a part of a composition. Such versions may include for example an acoustic version of a song, an electric or synthesized version of the same song, a hip-hop version, a classical version, etc. Similarly, various artists may record and make available their own cover versions of the same song. Other artists may wish to create a composition that may include certain variations of parts of the original composition, or of parts of variations of similar or different compositions.

SUMMARY OF THE INVENTION

An embodiment of the invention may include a system having a memory to store data representing a first version of a composition and a second version of the same composition, where each of such versions is divided into segments, and each of such segments includes a pre-defined portion of the composition, and the system also includes a processor to assemble a third version of the composition out of the first segment of the first version and the second segment of the second version. The third version may be stored in a memory that is associated with the processor, such that data representing the third version can be recalled to play the third version.

Is some embodiments the processor may issue a signal in advance, such as in advance of a time of a completion of a display or playing of the first segment of the first version, where the signal alerts a user that the first segment is about to finish and that the user may select a second segment to be combined with, assembled onto or linked to the first segment. A signal may also be issued by the processor to indicate that the second segment of the second version may linked to the first segment of the first version.

In some embodiments, a processor may present an indication, such as a visual indication, that the first segment of the new version was taken from the first segment of the first version, and the second segment of the new version was taken from the second version. Such indication, such as the visual indication may include an indication of a mode of the first segment and a mode of the second segment.

In some embodiments, the linking or association of the segments may include linking a set of data that represent or embody the first version to a set of data that embody the second version. In some embodiments the linking of the segments may preserve in the new version a musical flow of the composition or work.

In some embodiments, a processor may modify a duration of the second version to approximate a duration of the first version.

Some embodiments of the invention may include a method that designates a segmentation break at a pre-defined point in each of several versions of a composition, and accepts an instruction from a user to alter at the segmentation break a display of a first of versions of the composition and to continue from the segmentation break point a display of the second version of the composition.

In some embodiments, the instruction may be recorded to associate the instruction with the first versions and the second version.

In some embodiments, the method may include presenting a visual or audio display of an indication of a segmentation break in advance of a display of the pre-defined point of the first segment; and displaying an indication of the second versions that is suitable to be associated with the pre-defined point of the first version.

In some embodiments, a processor may modify a duration of the second version to match a duration of the first versions Some embodiments of the invention may include a method that presents to a user an indication of recordings of a composition, where each of the recordings includes a segmentation indication at a pre-defined point of the composition, and the method links at the pre-defined point of the composition, a set of stored data that represents a first segment of a first of recording of the composition, to stored data that represents a second segment of a second recording of the composition, and the method stores as a new recording, a set of data representing the first segment linked of the second segment.

In some embodiments, the method may issue to the user a signal in advance of the pre-defined point of the composition, where the signal indicates to the user possible selection of a second segment of one or more other versions of the work that may be linked to the first segment.

Some embodiments of the invention may include a method that presents a visual representation corresponding to first segments of various versions of a composition, where the method includes accepting a selection of a first segment from among the various first segments, presenting a various possible immediately subsequent segments of the various versions of the work, accepting from a user a selection from among the various immediately subsequent presented segments, appending the selected subsequent segment to the first segment, repeating the process of presenting, selecting and appending of subsequent segments of the composition until an entire duration of the composition is assembled. In some embodiments, a processor may select a default segment from a version to be appended to the version if a user fails to select another segment to be appended to the version being assembled.

Some embodiments of the invention may include a method that presents to a user possible pre-defined variations for a first segment of a work, and that accepts a selection from among the presented first segments of the work, and that identifies a second set of pre-defined variations for a second segment of the work, where the second set is based, or is a derivative of the selection that was made by the user for the first segment. The method may accept a selection from among the set of pre-defined variations for the second segment of the work, and may associate the selection from the first set with the selection from the second set.

Some embodiments of the invention may include a method that defines a start point and an end point for a segment in a work, that presents an indication of variations of the work that may be inserted as a segment of in a new version of the work, that accepts a selection made by a user from among the possible variations of the work to be inserted as a segment in a new version of the work and that inserts data representing the selected variation as a segment in the new version of the work.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

Figure 1:
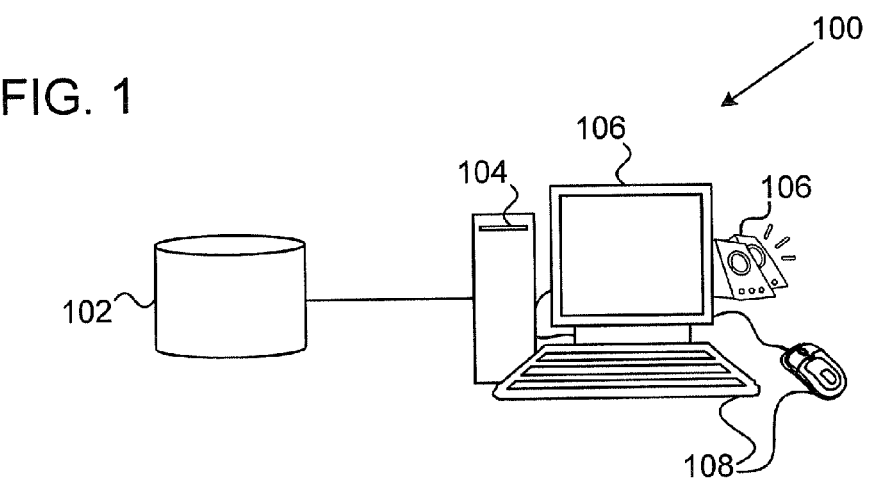
FIG. 1 is a conceptual illustration of a system in accordance with an embodiment the invention.

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

An embodiment of the invention may be practiced through the execution of instructions that may be stored on an article such as a disc, memory device or other mass data storage article. Such instructions may be for example loaded into a processor and executed. The instructions may be stored in a memory of a computer as a client executed application. Such client executed application may store links to segments of music or video or may store data representing music or video. An application may be executed by a processor, and segments of data representing music, sound, images or video may be manipulated in accordance with instructions that may be stored in a memory and that may be are associated with such segments.

When used in this paper, the terms "composition" or "work", may, in addition to their regular definition, refer to a song, musical opus, video presentation, audio recording, film, movie, advertisement or other collection of audio and or audio plus visual signals that are assembled into a work that has identifiable components. For example, a composition may refer to a song having stanzas and verses, or bars and phrases, where in general, stanzas are linked to or follow verses, and verses are linked to or follow stanzas. The terms "mode" or "version" of a composition may, in addition to its regular definition, refer to a style or identifiable characteristic of a particular recording of a given composition, or a recoding made or sung by a particular artist. For example, a given song, video, speech or film may be recorded in an acoustic version, an electric version, a hip-hop version, a jazz version or other versions. The same song or video may be recorded by various artists or combination of artists in their own respective versions. In some embodiments, each of such versions may include all of the components of the particular composition, such as all or most of the stanzas, verses, notes or scenes of the composition. Typically, the information or data manipulated in embodiments of the invention is one or more audio recordings of compositions or works.

When used in this paper, a "segment" may in addition to its regular meaning, refer to a pre-defined portion of a work or composition, or a interval of either a defined or undefined period during a work or composition that may be set off with a start time at a certain point during the composition, and/or an end time during the composition, at which point another segment of the composition may begin or at which point a non-segmented portion of the composition may resume. In some embodiments, a segment may refer to a space or blank during a song or composition into which space or blank a variation may be inserted.

When used in this paper, a "progression of a recording" may refer to a scale or measure of the progress of a recording relative to its complete play. For example, a progression may refer to an elapsed time or period of a recording, as such time or period may be initiated from a beginning or end of a recording. In some embodiments, a progression may refer to a point in a series of musical notes, lyrics, images or other known events or markers in each of two or more recordings of the composition. For example, if the notes or lyrics or a musical or audio composition are known, a progression of the recording may include a tracking of the notes played or heard in one or more versions of the recording. A progression may be consistent between two or more versions of a recording such that a point in a progression of a first version may be tracked and associated with a corresponding point on a second version.

When used in this paper, the term "variation" may, in addition to its regular meaning, mean a portion of a song, movie, clip, or advertisement that may be inserted into or combined with one or more other portions of a song, movie or clip at a pre-defined point in the song, movie or clip. A variation may include lyrics, music, images or music that are different from the original song, movie or clip into which the variation is being added, and that are different from the other variations. A variation may be differentiated from a version in that while a version will generally be or include the same work that is being sung or played in a different way, a variation may be or include a different lyric, song or beat but that may be related to the original song or to the other segments to which the variation may be added by the fact that it is musically similar or creates a musically, lyrically or visually desired effect when it is combined with the other segments to which it is added.

In some embodiments, various versions of the same composition, each assembled as discussed herein, may be recorded and made available for users or consumers to select from, depending on their taste, mood or other preference.

Reference is made to FIG. 1, a conceptual illustration of a system in accordance with an embodiment of the invention. In some embodiments, system 100 may include for example a memory 102 such as a magnetic storage device, flash, RAM or other electronic storage device suitable for mass storage of data such as digital or analog audio or video data. In some embodiments, one or more segments of memory 102 may be divided or structured into a data base or other structured format that may associate one or more data entries in memory 102 with one or more other data entries in memory 102. In some embodiments, structured data may be stored or accessible by reference to for example, a mark up language such as for example, XML (Extensible Markup Language) or other mark up languages. System 100 may also include a processor 104 such as a processor suitable for digital signal processing, encoding and decoding of large data streams and for large-scale data manipulations such as image processing. Processor 104 may include more than one processor such as for example a controller, CPU or a video processor that may operate for example in parallel or in other configurations. System 100 may also include one or more display or output device 106, such as speakers or a video display, and an input device 108 such as a key-board, mouse, microphone touch screen or other input device 108.

In operation, processor 104 may execute code such as music or video playback code (e.g., stored in storage 102), which inputs music or video data (e.g. also stored in storage 102) and cause music to be output from an output device 106 (e.g. a speaker) and/or video to be output from an output device 106 (e.g. a monitor or display). Processor 104 may execute code to carry out methods as disclosed herein.

In operation, memory 102 may be loaded with or store two or more versions of a composition such as a song or video. Each of the recorded and stored versions may be marked, or divided into segments, where each such segment represents or is associated with a known portion of the composition. The beginning or ending markings of such segments may not be visible or audible, but may designate or set-off the start and/or end the segment.

A user may be presented with a selection of versions of the composition, and may choose a first version that is to be played. At some point in the progression of the first chosen version, the user may select a segment of second version of the recording that is to be inserted as part of a new version of the recording that the user is creating. Processor 104 may identify the segment most closely fitting the user's selection, and may copy or insert the selected segment of the second version into the version of the composition that the user is creating. This process may be repeated until all of the segments of the recoding are included in the user's new version.

The user may in this way, select a first stanza or segment of, for example, a song in an acoustic mode, a second stanza from an electric mode and a cadence from a jazz mode. In some embodiments the segments may be combined seamlessly so that beat, rhythm, pitch and other musical characteristics are retained in the movement from a segment in one mode to a segment in another mode and so that a complete, uninterrupted and seamless version of the new version is created that includes a segment from the acoustic version, a segment from the electric version and a cadence from the jazz version.

In some embodiments, segments may divide all or some of the recorded versions of a composition, such that a first segment of each of the rock, acoustic and jazz version of a composition may include only a first stanza or other pre-defined portion of the composition in each of the versions. The second segment in each of the same rock, acoustic and jazz versions may include only the first stanza of the composition. Subsequent segments may include for example subsequent stanzas or verses, instrumental portions, cadences or other portions of the composition. Parallel segments in each of the versions may thereby define particular portions of the composition. For example, a fifth segment in each of the rock and acoustic versions may point to and include for example the twelfth through fifteen line of the song or video that is the subject of both of the recorded versions. In some embodiments, the segment markers or set off points may be loaded into for example a mark-up data language such as an XML format, and the segments of many recorded versions may be associated with or linked to each other.

In some embodiments, a play speed of one or more versions of a recording may be altered so that the total duration of the various versions of the composition from which segments may be chose, may be relatively or approximately uniform. Such alterations of play speed may be performed with tools such as ableton Live™, Qbase™ software products or other suitable audio recording tools Each of the respective first, second, third, and nth markers, break points or segment set-off points of all of the recorded versions of a particular recording may therefore uniformly point to the identical or corresponding portions of the recorded work. Such uniform definition of the segments may allow the segments, when combined, to create a musically seamless or continuously flowing work without the need for a user to make further adjustments to links between the segments. For example, a user may select a first segment from a first version, a second through fourth segment from a second version and a final segment from the first version, and such segments may be combined by the processor to create a seamlessly flowing version of the recording.

In some embodiments, a version may contain many or even hundreds of defined segments so that a processor 104 may locate a segment point that is close to any point in the recording even if the user did not issue a signal to switch segments at the precise timing or location of a segmentation point.

In some embodiments, a system may store the various segments (or pointers to such segments) that were selected by a user from two or more versions, and may replay the segments as a new version created by a user. In this way, users may create new versions of a known recording by assembling pieces of various versions of the recording.

Figure 2:
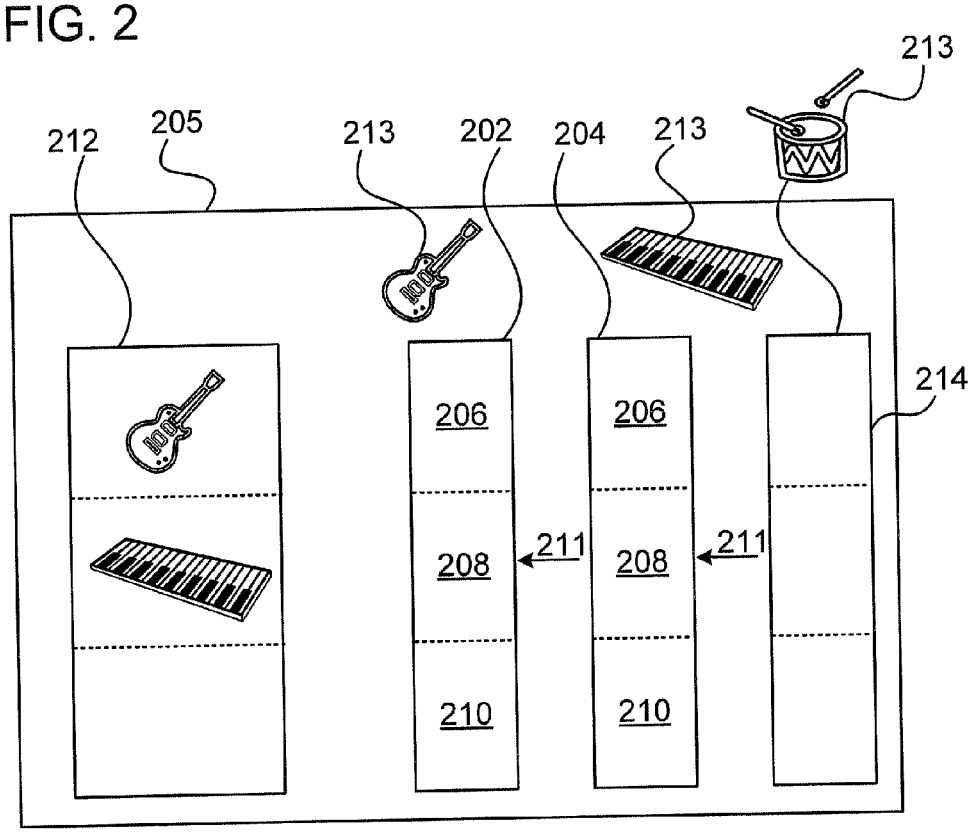
FIG. 2 is a conceptual illustration of segments of various versions of a composition and possible combinations of such segments into a created version of the composition in accordance with an embodiment of the invention.

Reference is made to FIG. 2, a conceptual illustration of a display of versions and segments of versions of a composition in accordance with an embodiment of the invention. A display may present a representation of a first version 202 and a second version 204 of a recording by way of for example a graphic user interface 205 (e.g., displayed on a monitor such as a output device 106), and may indicate graphically, the mode of each of the displayed versions 202 and 204, and the location (by way of for example a graphic arrow or marker 211) in a progression of the recording of the various segments 206, 208 and 210 that are defined in the versions. For example, a particular version may be labeled with a name, icon 213 or avatar that may represent the version or the artist who performed the version.

A recording may begin to play by way of a video and for audio output, and the display may indicate to a user the progress of the playing of the version of the recording on a display. In advance of reaching for example an end of a defined segment 208, the display may indicate an upcoming decision point wherein the user may decide which, if any, of the possible choices of segments 208 from other versions 204 may be inserted into the version that he is creating. For example, such advance notice may be displayed or presented to a user by way of a user interface or by a sound indication, for example a few seconds before the end of the segment that is then playing or being shown. In some embodiments, a display of a countdown may be added to indicate to the user the point on the recording by which he must make his selection during the course of the play of the then current version. In advance of the decision point, a display of the possible alternative segments 208 from versions 204 and 214 that may be selected may be provided to the user, and such display may hover and then disappear when the decision point passes or a selection of a new segment 208 has been made.

In some embodiments, if no selection of an alternative segment is made by a user, the default action may be set to continue playing the version that is then progressing. Other defaults may be used such as for example randomly altering versions at one or more segment breaks. If a selection of a segment from another version 214 is made, the graphic display may indicate the new version then being played, and may for example highlight or otherwise show the path of the various segments that have been selected for inclusion in the new version and the current version being played.

In some embodiments, the path or segments from versions that have been selected may be displayed for the user, and stored to show and retain the new version created by the user. The segments may be joined to create an original version of the recoding consisting of various segments of assorted versions of the composition.

In some embodiments, a user may download or otherwise import into a client or other application the versions from which selections of segments may be made. In some embodiments, no such downloading may be required, and instead a reference, such as an HTML (HyperText Markup Language) site, to segments of various versions that are stored remotely, may be presented to the user, and the user may store his newly created version by storing in a memory such references to the remotely stored versions. In some embodiments, the application may detect the bandwidth that is available on the user's computer as well as the speed of the recording, and may store or download the appropriate amount of data to facilitate smooth playback. In some embodiments, the user's created version 212 may also be stored remotely and made available to other users who may for example download version 212 to a computer or other device, use segments of such user's version 212 to create their own new versions, or other uses.

The client or application may include control functions such as for example play, pause, rewind, volume and other common controls for audio and video recording or playing.

Figure 3:
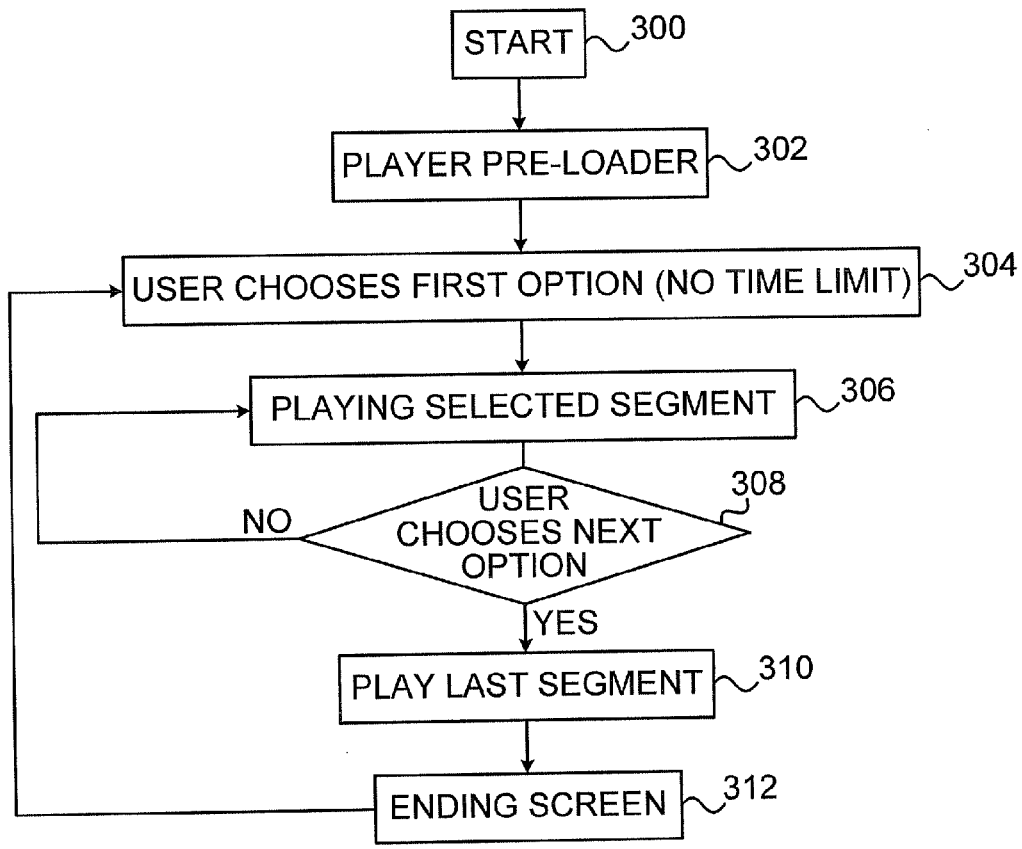
FIG. 3 is a flow diagram of a method in accordance with an embodiment of the invention.

Reference is made to FIG. 3, a flow diagram of a method in accordance with an embodiment of the invention. In block 300 a user may be presented with a start screen where for example the user may select the recording and two more versions of the recording that may be available. In some embodiments, various characteristics, data and descriptions of the recording and the version may be loaded into the application and may be displayed, r played back or presented. In block 302, the player or client software that is stored in a memory may be pre-loaded with at least some of, or portions of, the initial segments of the various versions of the recording, as were selected by the user. In block 304 the user may select the version for the first segment from which the recording is to begin, and the first segment of such version may become the first segment in the user's new version. In block 306, the selected segment may be played for the user, and portions of the upcoming segments that may be selected by a user at the next decision point may be pre-loaded or buffered into the application. In block 308, if the segment then being played is not the last segment of the recording, one or more versions of the subsequent segment or segments may be presented to the user for his selection. In block 310, the process of presenting and selecting segments of a recoding may continue until the last segment of the recording is reached. In block 312, an ending screen may be presented to a user where the summary of the selected and assembled segments are displayed or played, and the user may be prompted to save, share, upload or otherwise use the newly created version. In some embodiments, such final version may be stored in a memory associated or connected with a client that may run an application executing an embodiment of the invention. In some embodiments, the process of selecting segments and adding such selected segments to the song as it plays may be made in real time and while the song is playing for the user.

Figure 4:
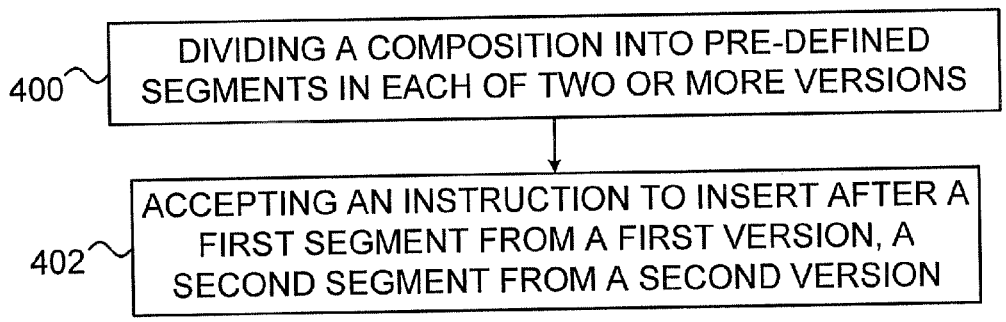
FIG. 4 is a flow diagram of a method in accordance with an embodiment of the invention.

Reference is made to FIG. 4, a flow diagram of a method in accordance with an embodiment of the invention. In block 400, there is presented an indication of versions of a composition, where each such version includes segmentation marks at each of a number of pre-defined points. In block 402, a segment from a first version is joined at one of the pre-defined points to a segment from a second version. In block 404, there is stored or recorded an indication of the joined segments from each of the versions and an indication of the segmentation point at which such segments were joined.

In some embodiments, a signal, such as a displayed or audio signal on a user interface, may be issued in advance of the end of segment, to alert the user that the current segment will soon be completed and that he will have an opportunity to change or alter the flow of his newly created version by substituting a segment from a different version that the one he is now using. If the user does not input a signal for such substitution, then the display may default to continue showing or playing the version then being played or may choose a random version to add to the segments that were already assembled.

In some embodiments, there may be presented to a user an indication of which segments from among the various versions are suitable for being assembled onto the version then being played. For example, at a particular point in a song, a piano instrumental may be heard, and a display may show that another version of the song includes a guitar instrumental that can break up the piano instrumental and that can be inserted after the piano instrumental. The display may also indicate that a cappella version of the song may not be suitable or appropriate for insertion at such point.

In some embodiments, a display may be presented that shows the origin or the various segments that have been assembled into the newly created version. For example, a graphic or icon of a guitar may be overlaid onto a graphical display representing a first segment of the user's newly created version to show that that the source of the segment is an electric guitar version or a hip-hop mode or version of the recording. The icon or graphic of the segment as incorporated into the newly created version may be similar to or identical with the icon or graphic of the version that was the origin of the segment. An avatar of a particular singer may be overlaid onto a second segment to show that such second segment was taken from a version performed by the particular singer.

In some embodiments, a process of assembling the various segments may include linking an end of the first segment with a start of the second segment while maintaining a musical flow of the newly created version. For example, the segments may be linked to maintain a beat, key, tone, pitch or other characteristics of one or more of the original versions. In some embodiments the linking, moving, connecting or manipulating of segments may be accomplished by manipulating data that when processed through a player may reproduce music, sounds, images or video. Representations or links to such segments of data that represent the music or image may be stored, displayed, manipulated or processed.

In some embodiments, a processor may accept a signal from a user at various points in the course of the play or display of a version of the composition, even if such points are not associated with a defined break point or segmentation point. The processor may then select the closest or otherwise most suitable break point or segmentation point for that can be used to alter the flow of the play to substitute the then current segment for a segment selected by the user In some embodiments, a processor may modify a duration of various versions of a composition so that such durations are approximate the same.

In some embodiments, one or more artists or composers may record multiple variations of one or more segments of a song or music video. For example, a segment of a love song may be recorded in the masculine, as a man singing about a woman, or in the feminine, as a woman singing about a man, such that in the first variation of a segment, the song is about "her eyes", and in the second variation of the segment the song is about "his smile". Another segment may be recorded in a first variation where a man and a woman break up and never see each other, in a second variation of the segment where the man and the woman break up but then get back together again, and in a third variation of the segment where the man and the woman break up and the woman returns to demolish the man's car. Other variations and permutations of segments may be recorded and presented to a user to create possible story lines that may be combined to weave different plots, song settings, genders or other factors in a song or music video. A user may select a first segment from among the first segment variations, and combine that segment with a second segment from among the second segment variations, and may continue combining segments into a song that carries a different plot, setting, ending or one or more other factors that are unlike any of the existing songs that were recorded by the artist. All of the segment variations may be of pre-defined length or have pre-defined starting and/or ending points at which each of such segment variations may be joined with one or more other segments.

In some embodiments, a variation may be inserted at a pre-defined starting point or break point (n), but may end at one of among several subsequent pre-defined ending points (n+2, n+3, etc.), rather than at the next break point (n+1). In this way, a long variation may be added in a spot that would otherwise have been filled with a shorter variation. In some embodiments, the various segments that may be combined may not share a particular melody, duration, tempo, musical arrangement or other pre-defined characteristics, except for a designation by the system of a pre-defined beginning and/or end to the particular segment, and that an end to a first segment is to be followed by a beginning of one from among various second or subsequent segments.

Figure 5:
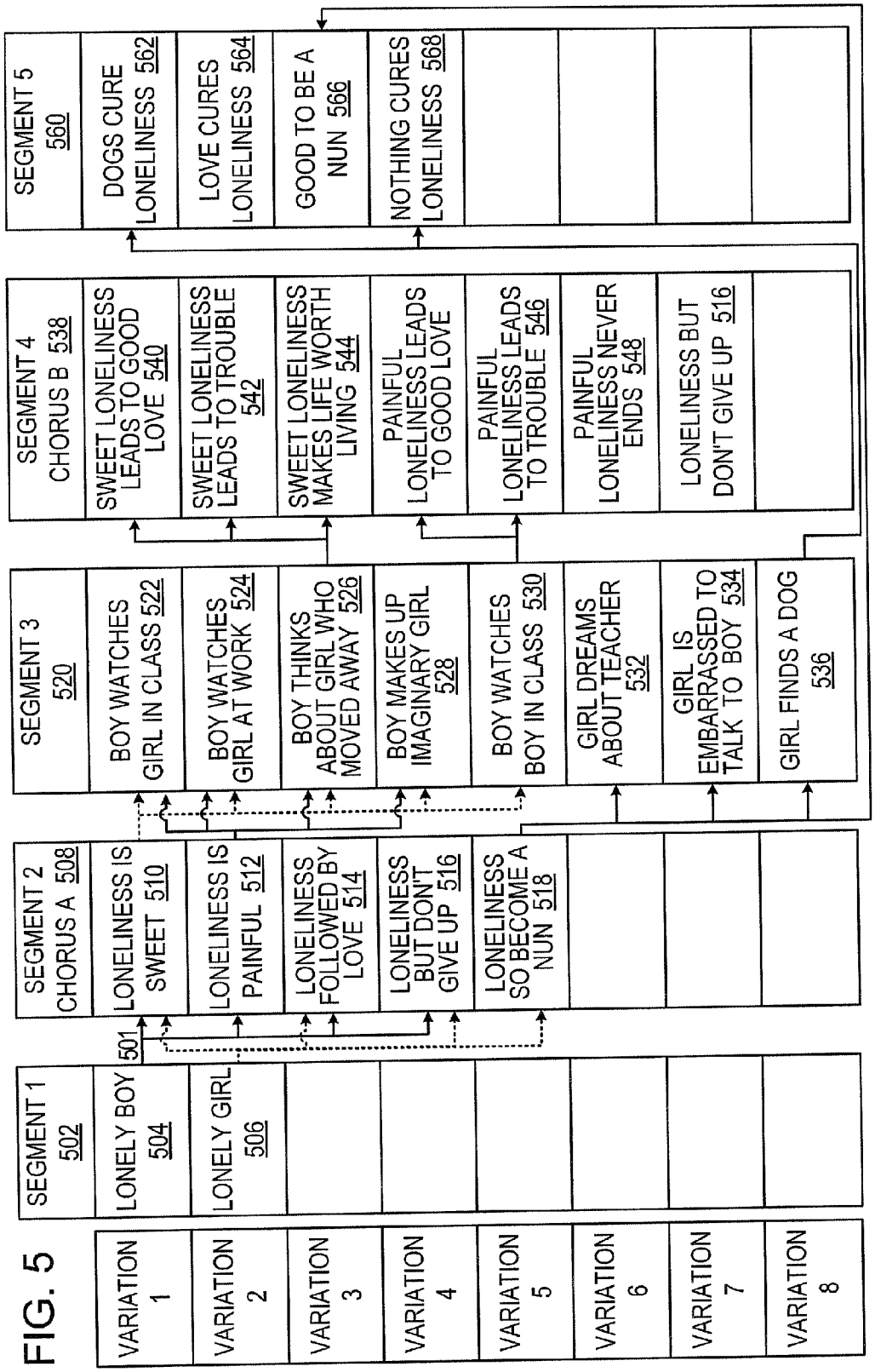
FIG. 5 is a flow diagram of multiple variations of segments of a composition, and possible connections between the variations, in accordance with an embodiment of the invention

Reference is made to FIG. 5, a conceptual diagram of possible variations of a series of segments that may be constructed into a song or music video by for example an application in accordance with an embodiment of the invention. For example, in a first segment 502, a user may be presented with two variations from which he may choose, a first variation 504 is a stanza about a lonely boy, and a second variation 506 is a stanza about a lonely girl. If a user selects segment 504 as a first segment in the construction of his song or video, then the system will limit, define or present to the user that only variations 510 through 516 in segment 2 508 are suitable to follow selected variation 504 of segment 1 502 that can follow. In FIG. 5, the suitability of variations that may follow a selected variation are shown as solid lines 501. As shown in FIG. 5, variation 518 may not be suitable to follow variation 504, and a user will therefore not be presented with variation 518 as a possible variation to follow variation 506. If a user first selects variation 504 as his selection for segment 1 502, and then selects variation 510 as his choice for segment 2 508, the system may present variations 522 to 530 to the user for possible selection as segment 3 520. This process of presentation, selection of possible variations and choice by the user may be continued until for example a variation has been selected for all of the segments. In some embodiments, a variation need not be chosen for each segment. For example, if a user chooses variation 506 for segment 1 502, and then chooses variation 518 as a selection for segment 508, the user may then be presented with variation 566 as a final selection for the user's song, such that the user will have selected only three segments that are to be constructed into a song or video. In some embodiments, a variation in a prior segment may be re-used or presented again as a possible choice in a subsequent segment. For example, variation 516 may be presented as a possible choice for segment 2 508, and may be presented again as a possible choice for segment 4, such that a variation may be re-used in multiple segments in a work. In some embodiments, a use of a variation 516 in segment 4 538 may be associated with different variations in segment 5 560 to account for the use of variation 516 twice or to account for the placement of variation 516 near the end of the work.

In some embodiments, a user may be presented with a selection of variations for one or more segments, and may choose a first variation that is to be played or assembled. At a certain point during the segment or after the segment ends, the user may select a variation for the second segment as part of a new version of the recording that the user is creating. A processor may identify one or more segments that closely fit the user's selection and that match or are musically compatible with the then just-ended segment. The processor may assemble the selected or closely fitting segment after the then just-ended segment. This process may be repeated until some or all of the segments of the recoding have been selected in the user's new version. As part of the selection process, the processor may match musical characteristics of one or more previously selected segments to the possible segments that may be selected by the user in subsequent segments. Such assistance by the processor may increase the musical quality of the assembled segments. In some embodiments, a user may be presented with the relative quality of the match between assembled segments or variations that are presented for possible assembly. For example, a processor may compare any or all or rhythm, pitch, timing or other characteristics of variations and indicate to a user which of the variations includes characteristics that would match the segments already assembled.

In some embodiments, a user may select a variation to be inserted in a segment even after the pre-defined insertion point has passed in the playing of the song. In such case, the variation to be inserted may be stored and played in the point designated for insertion in a next playing of the composition. In some embodiments, a selection variation may be associated with one or more next variations from which a user may select to follow the selected variation.

In some embodiments, a system may randomly select variations for insertion into some or all of the segments.

In some embodiments, segment 1 502, may not be the start of a song, video, work or recording, but may represent the first spot or space in a recorded work that is available for insertion by a user of a selected variation. For example, a user may be presented with a first stanza of the song "Mary Had a Little Lamb", where such first stanza includes the usual lyrics. The user may be presented with several variations of a first segment, that is actually the second stanza of the work, where such variations include different music, lyrics, tempo, etc. Similarly, the user may be presented with multiple variations of a third stanza from which to choose. Finally, the system may insert a final stanza without giving the user a choice of variations from which to choose.

In another embodiment, a system may present to a user a recoding of the song "Happy Birthday", and may designate a start point for a segment that starts with the end of "Happy Birthday dear". A user may be presented with an assortment of recordings of names from which may be selected a recording of a sung name that will be inserted into the segment. The end of the inserted segment may be the end of the recorded name, and the recorded work may continue with "Happy Birthday to you". The newly created work may include the recorded first part, the selected segment, and the recorded ending.

In some embodiments, the assembled variation, or signals associated with the assembled variations, may be stored. The assembled variations in the form of a newly created work may be played, stored or distributed. In some embodiments, the assembled segments may constitute a newly created musical composition.

Figure 6:
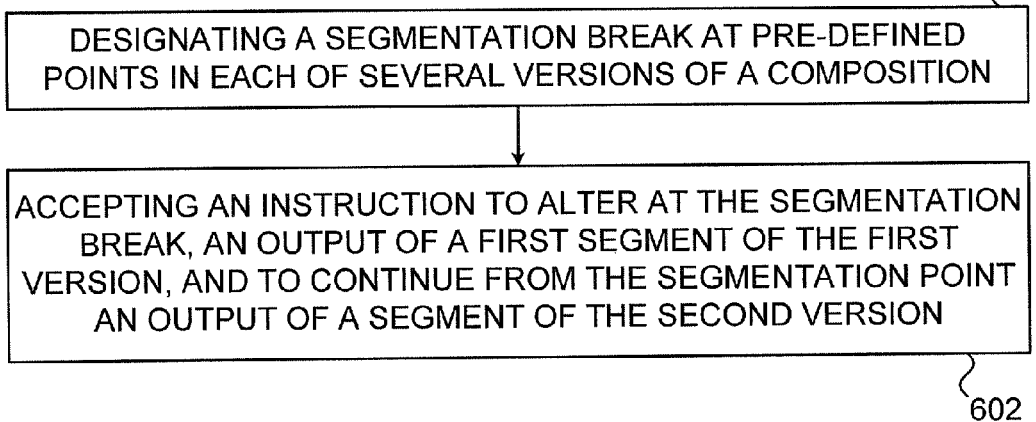
FIG. 6 is a flow diagram of a method in accordance with an embodiment of the invention.

Reference is made to FIG. 6, a flow chart of a method in accordance with an embodiment of the invention. In block 600, there may be designated a segmentation break at a predefined point in each of a several versions of a composition. In block 602, an instruction may be accepted from, for example a user, to alter at the segmentation break, an output of a first segment of the first version, and to continue from the segmentation point an output of a segment of the second version.

Figure 7:
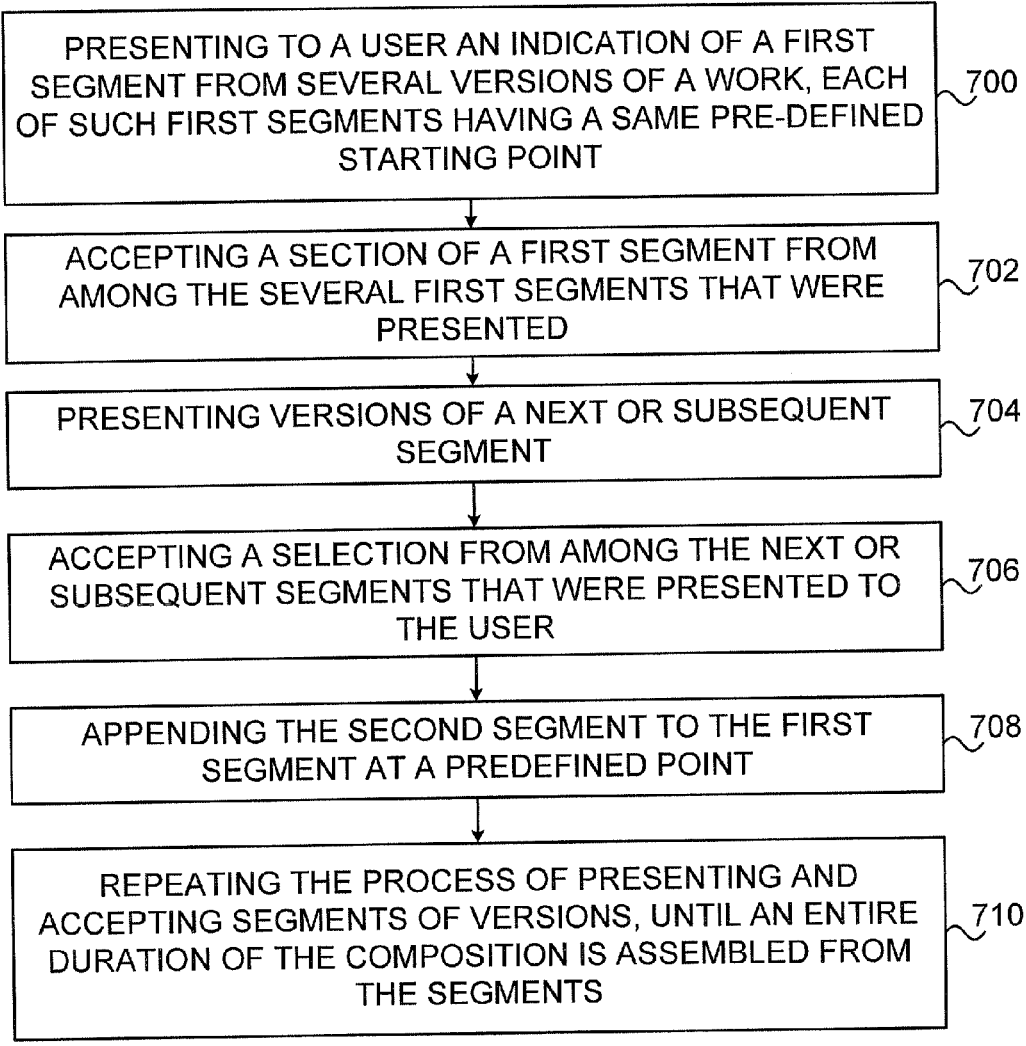
FIG. 7 is a flow diagram of a method in accordance with an embodiment of the invention.

Reference is made to FIG. 7, a flow chart of a method in accordance with an embodiment of the invention. In block 700, there may be presented to a user an indication of a first segment for several versions of a work, where each of such first segments has a same pre-defined start point. In block 702, there may be accepted from a user by for example a processor a selection of a first segment from among the several first segments that were presented from the versions. In block 704, there may be presented to for example a user several versions of a next or subsequent segment for one or more of the versions that were presented for the first segment. In block 706, there may be accepted from the user a selection from among the next or subsequent segments that were presented to the user. In block 708, the selected first segment may be appended, assembled or attached to the second segment at a predefined point so that a musical quality of the combination of the two segments is maintained. In block 710 the process of presenting segments of versions, accepting a selection of a segment and appending the selected segment to the prior segment may be repeated until an entire duration of the composition is assembled from the segments.

Figure 8:
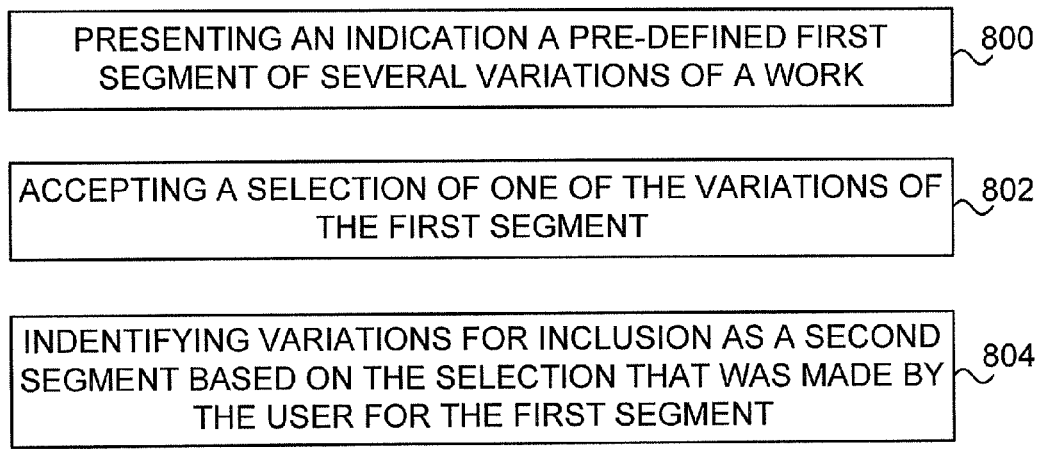
FIG. 8 is a flow diagram of a method in accordance with an embodiment of the invention.

Reference is made to FIG. 8, a flow chart of a method in accordance with an embodiment of the invention. In block 800, there may be presented to a user an indication a predefined first segment of several variations of a work. In block 802, a processor may accept from for example a user a selection of one of the variations of the first segment. In block 804, the processor may select or identify several variations for inclusion as a second segment based on the selection that was made by the user for the first segment. For example, if a selected first segment is from a hip-hop version, the processor may present to the user various second segments that also have hip-hop sounds from different artists, or may include portions of different hip-hop songs from the same artist. In some embodiments, the processor may also present an indication of a relative suitability of the various presented second segments in light of the selected first segment, where from said first plurality for said first segment of said work.

Figure 9:
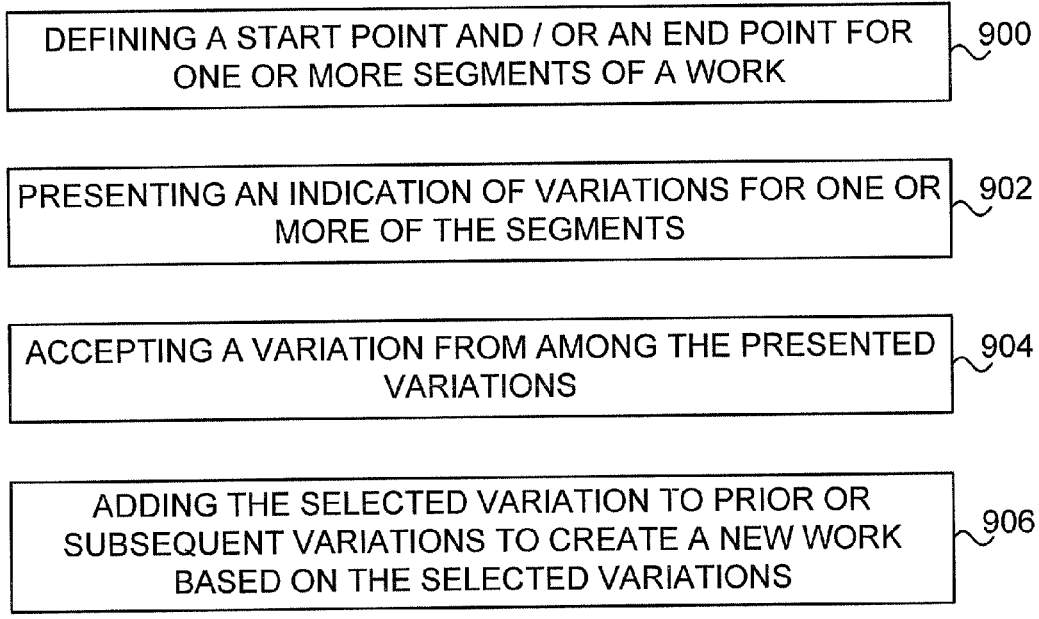
FIG. 9 is a flow diagram of a method in accordance with an embodiment of the invention.

Reference is made to FIG. 9, a flow chart of a method in accordance with an embodiment of the invention. In block 900, a start point and/or an end point for one or more segments of a work may be defined in a recording of the work. In block 902, an indication of several variations for one or more of the segments may be presented to a user. In block 904, a selection may be accepted for a variation from among the presented variations. In block 906, the selected variation may be added, combined or inserted into prior or subsequent variations to create a new work based on the selected variations.

It will be appreciated by persons skilled in the art that embodiments of the invention are not limited by what has been particularly shown and described hereinabove. Rather the scope of at least one embodiment of the invention is defined by the claims below.

I claim:

1. A system for facilitating the assembly of a composition, the system comprising:
    a memory to store data representing different predefined versions of a video presentation, the predefined versions comprising a plurality of predefined paths, each path comprising a plurality of audio/video segments, each audio/video segment representing a scene of the video presentation,
    wherein a particular one of the audio/video segments comprises a predefined decision period during which a user may select, in real-time as the particular audio/video segment is playing, a subsequent audio/video segment to be played automatically and immediately following a conclusion of playback of the particular audio/video segment,
    wherein the decision period of the particular audio/video segment begins subsequent to a beginning of playback of the particular audio/video segment and ends prior to the conclusion of playback of the particular audio/video segment; and
    a processor to assemble a plurality of the audio/video segments into a particular one of the paths, wherein the particular path is a predefined version of the video presentation having a plurality of seamlessly connected scenes, and wherein the processor is configured to:
    (i) during a first playback of the video presentation:
        automatically present to the user, during a decision period of a first audio/video segment, visual representations of two or more alternative audio/video segments from which a subsequent audio/video segment is selected;
        present, during playback of the first audio/video segment, a visual indicator of time remaining in the decision period of the first audio/video segment;

receive a selection of the subsequent audio/video segment from among the alternative audio/video segments;

play the selected subsequent audio/video segment following a conclusion of playback of the first audio/video segment;

automatically present to the user, during a decision period of the selected subsequent audio/video segment, visual representations of two or more second alternative audio/video segments from which a second subsequent audio/video segment can be selected, the second subsequent audio/video segment to be played directly following a conclusion of playback of the selected subsequent audio/video segment;

receive from the user, during playback of the video presentation after the decision period of the selected subsequent audio/video segment, a selection of one of the second alternative audio/video segments, wherein the selection of the one of the second alternative audio/video segments is received too late for the selected second alternative audio/video segment to be played directly following the conclusion of playback of the selected subsequent audio/video segment;

store in a memory the selection of the second alternative audio/video segment and a location of intended insertion of the selected second alternative audio/video segment, the location of intended insertion being directly after the conclusion of playback of the selected subsequent audio/video segment; and automatically play a default or random audio/video segment from the second alternative audio/video segments at the location of intended insertion instead of the selected second alternative audio/video segment, wherein the first playback of the video presentation results in a first one of the predefined versions of the video presentation; and (ii) during a second, later playback of the video presentation:

automatically play the selected second alternative audio/video segment at the location of intended insertion without requiring interaction from the user, wherein the second playback of the video presentation results in a second one of the predefined versions of the video presentation.

2. The system as in claim 1, wherein the processor further assembles a composition comprising the first audio/video segment and the subsequent audio/video segment for storage in the memory.

3. The system as in claim 1, wherein the processor is further configured to issue a signal in advance of a completion of playback of the first audio/video segment, the signal alerting a user of the upcoming completion of playback of the first audio/video segment.

4. The system as in claim 1, wherein the processor is further configured to issue a signal associated with one of the alternative audio/video segments, the signal indicating that the one of the alternative audio/video segments is suitable for assembly onto the first audio/video segment.

5. The system as in claim 1, wherein the processor is further configured to issue a signal indicating that flail the first audio/video segment comprises a first mode, and a signal indicating that a second one of the audio/video segments comprises a second mode.

6. The system as in claim 1, wherein the processor is further configured to assemble the first predefined version of the video presentation by linking an end of the first audio/video segment with a start of the selected subsequent audio/video segment.

7. The system as in claim 1, wherein the subsequent audio/video segment is selected based at least in part on a user-provided selection.

8. The system as in claim 1, wherein the subsequent audio/video segment is selected as a default selection.

9. The system as in claim 1, wherein the processor is further configured to present, during playback of the first audio/video segment, a visual indicator of time remaining until the selected subsequent audio/video segment is to be played.

10. The system as in claim 1, wherein at least one of the audio/video segments represents a predefined portion of two or more of the predefined paths.

11. A method of assembling a seamless composition, the method comprising:

i) storing data representing different predefined versions of a video presentation, the redefined versions comprising a plurality of predefined paths, each path comprising a plurality of audio/video segments, each audio/video segment representing a scene of the video presentation, wherein a particular one of the audio/video segments comprises a predefined decision period during which a user may select, in real-time as the particular audio/video segment is playing, a subsequent audio/video segment to be played automatically and immediately following a conclusion of playback of the particular audio/video segment, and wherein the decision period of the particular audio/video segment begins subsequent to a beginning of playback of the particular audio/video segment and ends prior to the conclusion of playback of the particular audio/video segment;

ii) assembling a plurality of the audio/video segments into a particular one of the paths, wherein the particular path is a predefined version of the video presentation having a plurality of seamlessly connected scenes;

iii) during a first playback of the video presentation:

automatically presenting to the user, during a decision period of a first audio/video segment, visual representations of two or more alternative audio/video segments from which a subsequent audio/video segment is selected;

presenting, during playback of the first audio/video segment, a visual indicator of time remaining in the decision period of the first audio/video segment;

receiving a selection of the subsequent audio/video segment from among the alternative audio/video segments;

playing the selected subsequent audio/video segment following a conclusion of playback of the first audio/video segment;

automatically presenting to the user, during a decision period of the selected subsequent audio/video segment, visual representations of two or more second alternative audio/video segments from which a second subsequent audio/video segment can be selected, the second subsequent audio/video segment to be played directly following a conclusion of playback of the selected subsequent audio/video segment;

receiving from the user, during playback of the video presentation after the decision period of the selected subsequent audio/video segment, a selection of one of the second alternative audio/video segments, wherein the selection of the one of the second alternative audio/video segments is received too late for the selected second alternative audio/video segment to be played directly following the conclusion of playback of the selected subsequent audio/video segment;

storing in a memory the selection of the second alternative audio/video segment and a location of intended insertion of the selected second alternative audio/video segment, the location of intended insertion being directly after the conclusion of playback of the selected subsequent audio/video segment; and automatically playing a default or random audio/video segment from the second alternative audio/video segments at the location of intended insertion instead of the selected second alternative audio/video segment, wherein the first playback of the video presentation results in a first one of the predefined versions of the video presentation; and iv) during a second, later playback of the video presentation:

automatically playing the selected second alternative audio/video segment at the location of intended insertion without requiring interaction from the user, wherein the second playback of the video presentation results in a second one of the predefined versions of the video presentation.

12. The method as in claim 11, further comprising alerting a user, in advance of a completion of playback of the first audio/video segment, of the upcoming completion of playback of the first audio/video segment.

13. The method as in claim 11, further comprising indicating that the one of the alternative audio/video segments is suitable for assembly onto the first audio/video segment.

14. The method as in claim 11, further comprising indicating that the first audio/video segment comprises a first mode and that a second one of the audio/video segments comprises a second mode.

15. The method as in claim 11, further comprising linking an end of the first audio/video segment with a start of the selected subsequent audio/video segment.

16. The method as in claim 11, wherein the subsequent audio/video segment is selected based at least in part on a user-provided selection.

17. The method as in claim 11, wherein the subsequent audio/video segment is selected as a default selection.

18. The method as in claim 11, further comprising presenting, during playback of the first audio/video segment, a visual indicator of time remaining until the selected subsequent audio/video segment is to be played.

19. The method as in claim 11, wherein at least one of the audio/video segments represents a predefined portion of two or more of the predefined paths.

* * * * *

UNITED STATES PATENT AND TRADEMARK OFFICE
CERTIFICATE OF CORRECTION

PATENT NO.        : 9,190,110 B2
APPLICATION NO.   : 12/706721
DATED             : November 17, 2015
INVENTOR(S)       : Bloch Page 1 of 1

It is certified that error appears in the above-identified patent and that said Letters Patent is hereby corrected as shown below:

In the Claims

In Claim 1, column 13, line 16, please insert --and-- after "sentation"

In Claim 5, column 13, line 60, please delete "flail"

In Claim 11, column 14, line 63, please insert --and-- after "presentation"

Signed and Sealed this
Fifth Day of July, 2016

Michelle K. Lee
*Director of the United States Patent and Trademark Office*